(12) United States Patent
Berkhin et al.

(10) Patent No.: US 8,452,832 B2
(45) Date of Patent: May 28, 2013

(54) SYSTEM AND METHOD FOR POPULATION-TARGETED ADVERTISING

(75) Inventors: Pavel Berkhin, Sunnyvale, CA (US); Shanmugasundaram Ravikumar, Cupertino, CA (US); Andrew Tomkins, San Jose, CA (US); John Anthony Tomlin, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 694 days.

(21) Appl. No.: 11/495,269

(22) Filed: Jul. 27, 2006

(65) Prior Publication Data
US 2008/0028066 A1  Jan. 31, 2008

(51) Int. Cl.
*G06F 15/16* (2006.01)
*G06Q 30/00* (2012.01)

(52) U.S. Cl.
USPC .......................................... 709/202; 705/14.66

(58) Field of Classification Search
USPC ................. 709/201–203, 217–219; 705/14, 705/14.49, 14.6, 14.66, 14.67, 14.53
See application file for complete search history.

(56) References Cited

U.S. PATENT DOCUMENTS

| | | | |
|---|---|---|---|
| 6,466,975 B1 * | 10/2002 | Sterling ........................ | 709/223 |
| 6,757,691 B1 | 6/2004 | Welsh et al. | |
| 6,839,680 B1 * | 1/2005 | Liu et al. ...................... | 705/7.33 |
| 7,162,522 B2 * | 1/2007 | Adar et al. .................... | 709/224 |
| 7,734,502 B1 * | 6/2010 | Yehoshua et al. ........... | 705/14.47 |
| 8,108,245 B1 * | 1/2012 | Hosea et al. ................. | 705/7.33 |
| 2001/0054086 A1 * | 12/2001 | Miyahira ..................... | 709/218 |
| 2002/0156679 A1 * | 10/2002 | Castle ............................. | 705/14 |
| 2003/0046148 A1 * | 3/2003 | Rizzi et al. ..................... | 705/14 |
| 2003/0154126 A1 * | 8/2003 | Gehlot et al. .................. | 705/14 |
| 2003/0208594 A1 | 11/2003 | Muret et al. | |
| 2004/0128193 A1 * | 7/2004 | Brice et al. ..................... | 705/14 |
| 2004/0186777 A1 * | 9/2004 | Margiloff et al. .............. | 705/14 |
| 2004/0186778 A1 * | 9/2004 | Margiloff et al. .............. | 705/14 |
| 2005/0033641 A1 * | 2/2005 | Jha et al. ........................ | 705/14 |
| 2005/0144073 A1 * | 6/2005 | Morrisroe et al. ............. | 705/14 |
| 2006/0212350 A1 * | 9/2006 | Ellis et al. ...................... | 705/14 |
| 2007/0011155 A1 * | 1/2007 | Sarkar .............................. | 707/5 |
| 2007/0078711 A1 * | 4/2007 | Anand ........................... | 705/14 |

(Continued)

OTHER PUBLICATIONS

Mobasher, et al. "Discover and Evaluation of Aggregate Usage Profiles for Web Personalization", 2002, Kluwer Aacademic Publishers, Data mining and Knowledge Discovery, vol. 6, pp. 61-82.*

(Continued)

*Primary Examiner* — Patrice Winder
*Assistant Examiner* — Julian Chang
(74) *Attorney, Agent, or Firm* — Michael J. Buchenhorner

(57) ABSTRACT

An improved system and method for web destination profiling for online population-targeted advertising is provided. A web destination profiler may be provided for generating web destination profiles. Traffic may be analyzed at a particular web destination in order to understand the population visiting the web destination. The analysis of user traffic, including differentiated clickstream data, may be applied for determining known characteristics of a web destination profile. Moreover, unknown characteristics of a web destination profile may be determined using a variety of techniques including inferring characteristics by modeling traffic flow through other web destinations, estimating characteristics from other web destination profiles by predicting traffic flow through other web destinations, propagating characteristics to a web destination profile by smoothing a joint distribution of characteristics of other web destination profiles, and so forth. Web destination profiles may be used by applications such as an online application for population-targeted advertising.

19 Claims, 8 Drawing Sheets

U.S. PATENT DOCUMENTS

| | | | |
|---|---|---|---|
| 2007/0156524 A1* | 7/2007 | Grouf et al. | 705/14 |
| 2007/0192194 A1* | 8/2007 | O'Donnell et al. | 705/14 |
| 2007/0244753 A1* | 10/2007 | Grouf et al. | 705/14 |
| 2008/0028067 A1 | 1/2008 | Berkhin et al. | |
| 2008/0040212 A1* | 2/2008 | Grouf et al. | 705/14 |
| 2008/0208947 A1 | 8/2008 | Shapira et al. | |

OTHER PUBLICATIONS

Eirinaki, et al. "Web Mining for Web Personalization", 2003, ACM Transactions on Internet Technology, vol. 3, No. 1, pp. 1-27.*

Srivastava, et al. "Web Usage Mining: Discovery and Applications of Usage Patterns from Web Data", 2000, SIGKD Explorations, vol. 1, Issue 2, pp. 12-23.*

Shahabi, et al. "Efficient and Anonymous Web-Usage Mining for Web Personalization", 2003, INFORMS Journal on Computing, vol. 15, No. 2, pp. 123-147.*

Mobasher. "WebPersonalizer: A Server-Side Recommender System Based on Web Usage Mining", 1999, Proceedings on the 9th Workshop on Information Technologies and System (WITS '99).*

Botella, et al. "Personalization through Inferring User Navigation Maps from Web Log Files", 2005.*

Mobasher, et al. "Automatic Personalization Based on Web Usage Mining", 2000, Communications of the ACM, vol. 43, No. 8, pp. 142-151.*

Berkhin et al., U.S. Appl. No. 11/495,932, filed Jul. 27, 2006, Communication from the U.S. Patent and Trademark Office mailed Dec. 24, 2008.

Berkhin et al., U.S. Appl. No. 11/495,932, filed Jul. 27, 2006, Communication from the U.S. Patent and Trademark Office mailed May 27, 2009.

Berkhin et al., U.S. Appl. No. 11/495,932, filed Jul. 27, 2006, Communication from the U.S. Patent and Trademark Office mailed Mar. 29, 2010.

* cited by examiner

SYSTEM AND METHOD FOR POPULATION-TARGETED ADVERTISING

CROSS-REFERENCE TO RELATED APPLICATIONS

The present invention is related to the following United States patent application, filed concurrently herewith and incorporated herein in its entirety:

"System and Method for Web Destination Profiling," U.S. patent application Ser. No. 11/495,932.

FIELD OF THE INVENTION

The invention relates generally to computer systems, and more particularly to an improved system and method for web destination profiling for online population-targeted advertising.

BACKGROUND OF THE INVENTION

Operators of websites offering online content may manage an inventory of advertisements that may be shown to visitors viewing content of a website. When a user may visit a website, the operator of the website or a third party may choose to show one or more advertisements to the user with the expectation that the user may select an advertisement to buy advertised goods or services. Advertisers may bid to have their advertisement shown to a visitor viewing particular content of the website. Or the operator of the website or third party may choose the advertisement and may generate revenue whenever a visitor may select an advertisement shown while viewing content of the website.

For some visitors of a website, properties of the visitor may be known and can be used for selecting an advertisement by matching the known properties of the visitor to the content being viewed. However, a vast majority of visitors may be unknown, and there may not be any known properties about the visitor that may be used for selecting an advertisement based upon content matching. Without any known properties for the vast majority of visitors, operators are unable to select advertisements that may be of interest to particular visitors based upon some known properties of who may be viewing content at the website. As a result, operators of such websites remain unlikely to be able to optimize revenue generation for selecting advertisements based on content matching, especially where revenue generation relies upon click-through rates of visitors.

What is needed is a system and method that may allow operators of websites offering online content to select advertisements for unknown visitors that may be of interest to particular visitors. Such a system and method should also be able to select advertisements for known visitors viewing content at the website.

SUMMARY OF THE INVENTION

Briefly, the present invention may provide a system and method for web destination profiling for online population-targeted advertising. A web destination profiler may be provided in an embodiment that may include an operably coupled traffic analysis engine for analyzing traffic at a web destination, a clickstream analysis engine for analyzing clickstream data from a web destination, a topology analysis engine for analyzing topology data about a web destination, and a smoothing engine for propagating characteristics to a web destination profile in a variety of ways, including from other web destination profiles, from link analysis of the connectivity of the website with other websites, from traffic analysis of the traffic between pages of the website and other pages, either on of off the website, from analysis of content of the pages or metadata such as tags to determine pages with similar content or tags elsewhere that may be used for smoothing. The traffic analysis engine may include an operably coupled model generator for generating a model of traffic flow among web destinations and a traffic flow analysis engine for propagating population characteristics to web destination profiles by predicting traffic flow through web destinations.

In general, the web destination profiler may provide services for generating web destination profiles. Traffic may be analyzed at a particular web destination in order to understand the population visiting the web destination. The traffic at a particular web destination may represent differentiated clickstream data and undifferentiated clickstream data. In addition, graph data and site structure information may also be used in analyzing traffic for a web destination. The analysis of user traffic, including differentiated clickstream data, may be applied for determining known characteristics of a web destination profile. Moreover, the analysis of traffic, including undifferentiated clickstream data, may also be applied for determining unknown characteristics of a web destination profile. In particular, unknown characteristics of a web destination profile may be determined using a variety of techniques including inferring characteristics by modeling traffic flow through other web destinations, estimating characteristics from other web destination profiles by predicting traffic flow through other web destinations, propagating characteristics to a web destination profile by smoothing a joint distribution of characteristics of other web destination profiles, and so forth.

Web destination profiles may be stored in storage for use by applications such as an online application for population-targeted advertising. For instance, an application that may display advertisements to users who visit a web destination, including managed content properties, may use the present invention to select advertisements using web destination profiles for display of the advertisements with content of the web destinations. Advantageously, an advertisement may be selected using the web destination profile where the system may have limited knowledge of the content of the web destination and/or the profile of the particular user visiting the web destination. Moreover, when traffic may not be observed or inferred, an approximate profile of characteristics may be generated by an analysis of the content of a web destination. In this way, unknown profile characteristics may be propagated from other web destination profiles of similar web destinations. Other advantages will become apparent from the following detailed description when taken in conjunction with the drawings, in which:

DETAILED DESCRIPTION

Exemplary Operating Environment

Figure 1:
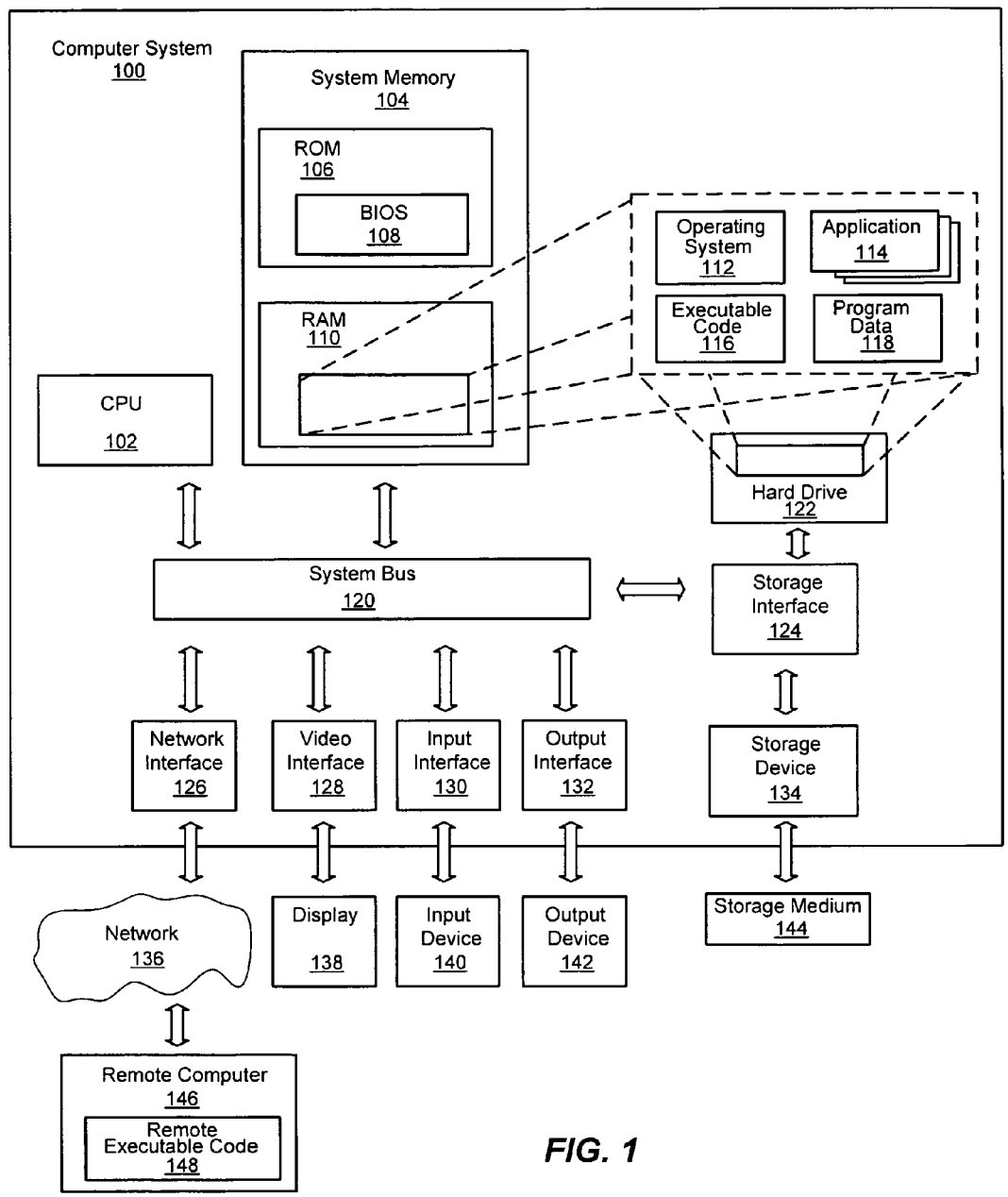
FIG. 1 is a block diagram generally representing a computer system into which the present invention may be incorporated.

FIG. 1 illustrates suitable components in an exemplary embodiment of a general purpose computing system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computing system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general purpose computer system 100. Components of the computer system 100 may include, but are not limited to, a CPU or central processing unit 102, a system memory 104, and a system bus 120 that couples various system components including the system memory 104 to the processing unit 102. The system bus 120 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer system 100. Communication media may include computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared and other wireless media.

The system memory 104 includes computer storage media in the form of volatile and/or nonvolatile memory such as read only memory (ROM) 106 and random access memory (RAM) 110. A basic input/output system 108 (BIOS), containing the basic routines that help to transfer information between elements within computer system 100, such as during start-up, is typically stored in ROM 106. Additionally, RAM 110 may contain operating system 112, application programs 114, other executable code 116 and program data 118. RAM 110 typically contains data and/or program modules that are immediately accessible to and/or presently being operated on by CPU 102.

The computer system 100 may also include other removable/non-removable, volatile/nonvolatile computer storage media. By way of example only, FIG. 1 illustrates a hard disk drive 122 that reads from or writes to non-removable, nonvolatile magnetic media, and storage device 134 that may be an optical disk drive or a magnetic disk drive that reads from or writes to a removable, a nonvolatile storage medium 144 such as an optical disk or magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. The hard disk drive 122 and the storage device 134 may be typically connected to the system bus 120 through an interface such as storage interface 124.

The drives and their associated computer storage media, discussed above and illustrated in FIG. 1, provide storage of computer-readable instructions, executable code, data structures, program modules and other data for the computer system 100. In FIG. 1, for example, hard disk drive 122 is illustrated as storing operating system 112, application programs 114, other executable code 116 and program data 118. A user may enter commands and information into the computer system 100 through an input device 140 such as a keyboard and pointing device, commonly referred to as mouse, trackball or touch pad tablet, electronic digitizer, or a microphone. Other input devices may include a joystick, game pad, satellite dish, scanner, and so forth. These and other input devices are often connected to CPU 102 through an input interface 130 that is coupled to the system bus, but may be connected by other interface and bus structures, such as a parallel port, game port or a universal serial bus (USB). A display 138 or other type of video device may also be connected to the system bus 120 via an interface, such as a video interface 128. In addition, an output device 142, such as speakers or a printer, may be connected to the system bus 120 through an output interface 132 or the like computers.

The computer system 100 may operate in a networked environment using a network 136 to one or more remote computers, such as a remote computer 146. The remote computer 146 may be a personal computer, a server, a router, a network PC, a peer device or other common network node, and typically includes many or all of the elements described above relative to the computer system 100. The network 136 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 148 as residing on remote computer 146. It will be appreciated that the network connections shown are exemplary and other means of establishing a communications link between the computers may be used.

Web Destination Profiling for Population-Targeted Advertising

The present invention is generally directed towards a system and method for web destination profiling for online population-targeted advertising. As used herein, a web destination may mean a web page, a directory, a web site, a collection of sites, or other destination. A web destination profile may mean a set or distribution of characteristics including demographic, geographic, and/or psychographic that may be associated with a population visiting a web destination. The present invention may provide a web destination profiler that may generate web destination profiles by analyzing traffic at a particular web destination in order to understand the population visiting the web destination. Traffic, as used herein, may mean visits to a web destination by users. The analysis of user traffic may be applied for determining known characteristics of a web destination profile and for determining unknown characteristics of a web destination profile using a variety of techniques. Even when traffic may not be observed or inferred, unknown profile characteristics may be propagated from other web destination profiles of similar web destinations.

As will be seen, applications that may display advertisements to users who visit a web destination, including managed content properties, may use the present invention to select advertisements using web destination profiles when the system may have limited knowledge of the content of the web destination and/or the profile of the particular user visiting the web destination. As will be understood, the various block diagrams, flow charts and scenarios described herein are only examples, and there are many other scenarios to which the present invention will apply.

Figure 2:
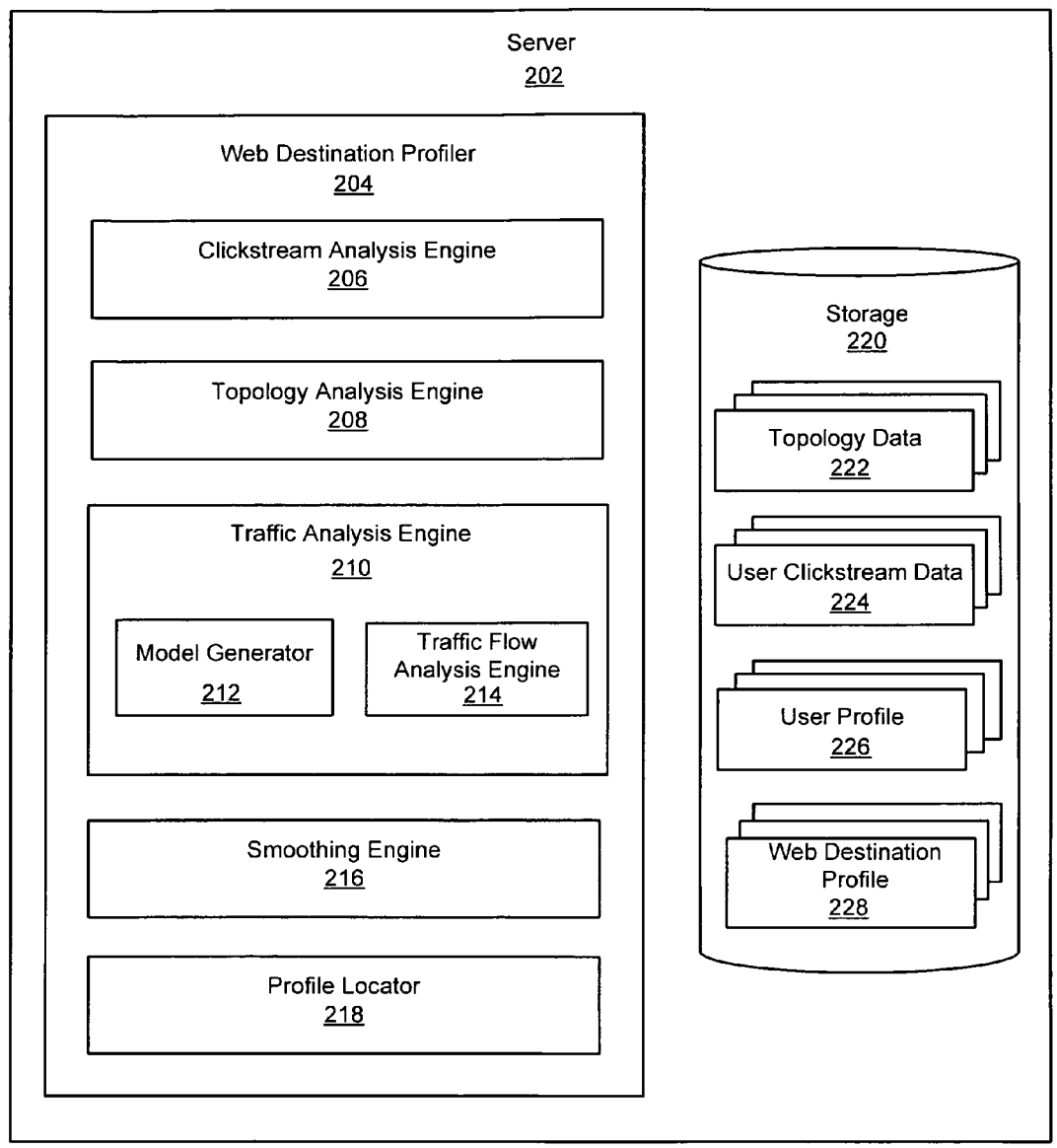
FIG. 2 is a block diagram generally representing an exemplary architecture of system components in an embodiment for web destination profiling for online population-targeted advertising, in accordance with an aspect of the present invention.

Turning to FIG. 2 of the drawings, there is shown a block diagram generally representing an exemplary architecture of system components in an embodiment for web destination profiling. Those skilled in the art will appreciate that the functionality implemented within the blocks illustrated in the diagram may be implemented as separate components or the functionality of several or all of the blocks may be implemented within a single component. For example, the functionality for the clickstream analysis engine 206 may be included in the same component as the traffic analysis engine 210. Or the functionality of the traffic flow analysis engine 214 may be implemented as a separate component from the traffic analysis engine 210. Moreover, those skilled in the art will appreciate that the functionality implemented within the blocks illustrated in the diagram may be executed on a single computer or distributed across a plurality of computers for execution.

In various embodiments, a server 202, such as computer system 100 of FIG. 1, may include a web destination profiler 204 operably coupled to storage 220. In general, the web destination profiler 204 may be any type of executable software code such as a kernel component, an application program, a linked library, an object with methods, and so forth. The storage 220 may be any type of computer-readable media and may store topology data 222, clickstream data 224, user profiles 226, and web destination profiles 228.

The web destination profiler 204 may provide services for generating web destination profiles 228. The web destination profiler 204 may include a topology analysis engine 208 for analyzing topology data 222 about web destinations, a clickstream analysis engine 206 for analyzing clickstream data 224, a traffic analysis engine 210 for analyzing traffic and user profiles 226, a smoothing engine 216 for propagating characteristics to a web destination profile from other web destination profiles, and a profile locator 218 for locating a web destination profile for a web destination. The traffic analysis engine 210 may include a model generator 212 for generating a model of traffic flow among web destinations for propagating population characteristics to web destinations and a traffic flow analysis engine 214 for propagating population characteristics to web destination profiles by predicting traffic flow through web destinations. Each of these modules may also be any type of executable software code such as a kernel component, an application program, a linked library, an object with methods, or other type of executable software code.

There may be a variety of applications which may use web destination profiling for online population-targeted advertising. These applications may optimize revenue based on a set of characteristics determined for visitors of a particular web destination. For instance, consider that many advertisements may be much more likely to be clicked on by certain types of users: males versus females, old versus young, Asian versus European, interested in digital cameras, and so forth. There may be many possible characterizations of a user which may be predictive of the likelihood of the user clicking on a particular advertisement. Assuming that such characteristics exist, it may not be necessary to know what the specific characteristics may be. It may be sufficient, that for a limited class of users, the value of a particular characteristic be known.

In various embodiments, the system may attempt to analyze the traffic at a particular web destination—this could be a web page, a site, a directory, a collection of sites, or some other destination. The traffic arriving at a destination may be drawn from some distribution. For instance, some fraction of the visitors may be 27-year-old males interested in photography, and some fraction may be from various other classes. Such a set of fractions may therefore be represented as a distribution over several variables that may include, for example, the age of a visitor as well as the gender and particular interests. By estimating a joint distribution over a particular set of characteristic variables for visitors to a particular web destination, the overall population visiting the web destination may be understood, and advertisements may be selected by understanding the population visiting the web destination rather than by only understanding a known user visiting the web destination. This technique may be referred to as population-targeted advertising as the goal may be to understand the population visiting a web destination and then to treat the current user as a representative of that overall population. The population information may be used in two ways. First, an advertisement may be selected so that the expected revenue over the population distribution may be maximized. Such a use of the population information may be applicable for an application where there may be little or no information about the current user. Or, the population may be employed as a prior distribution in attempting to estimate properties of the current user, based on some user-specific observation such as the recent browsing history of the user. These estimated properties of a current user may then be applied to select an advertisement.

Figure 3:
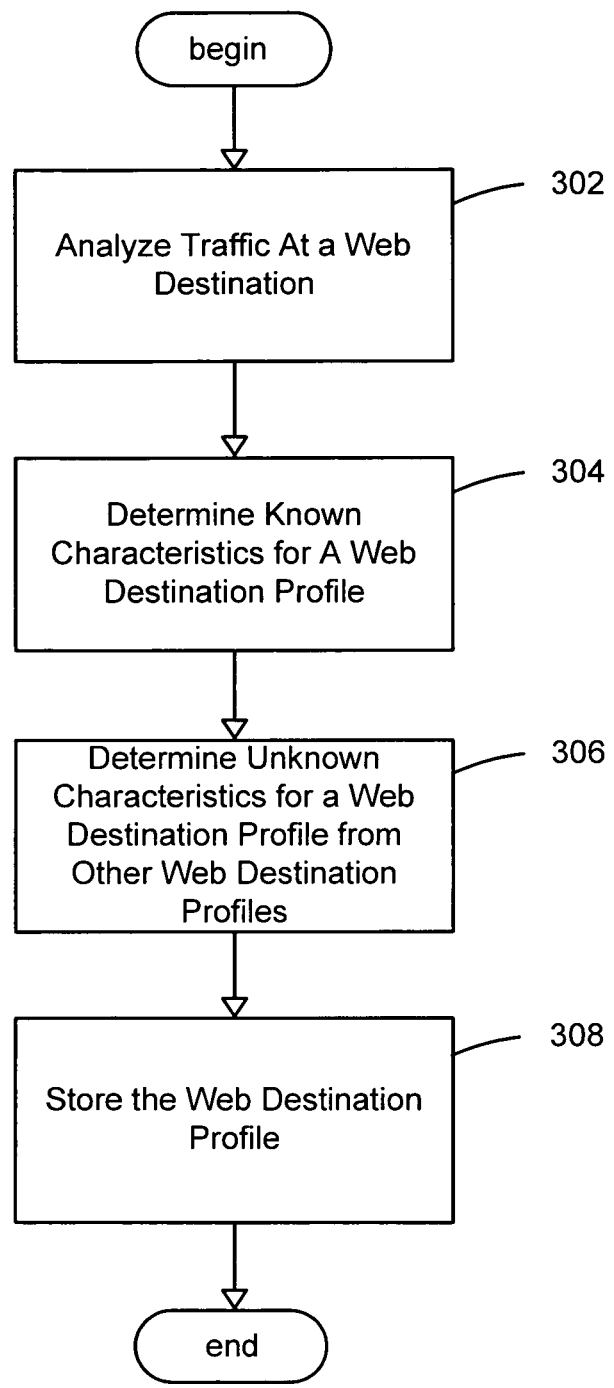
FIG. 3 is a flowchart generally representing the steps undertaken in one embodiment for web destination profiling, in accordance with an aspect of the present invention.
Figure 4:
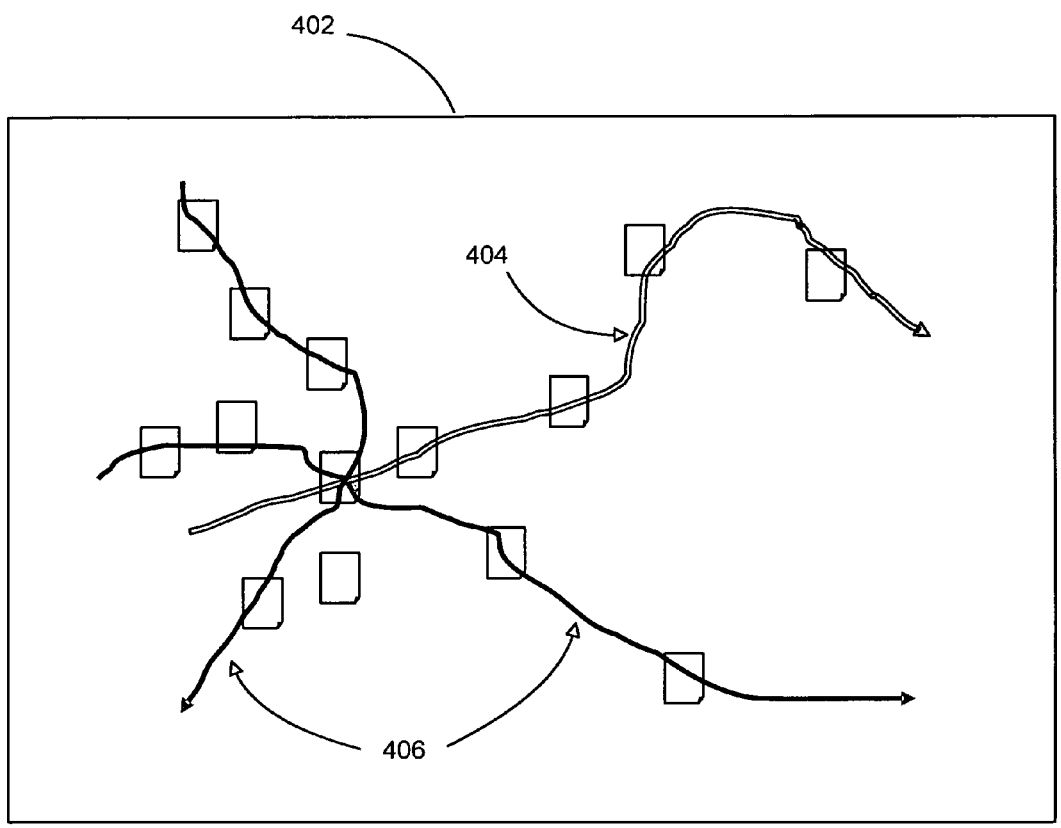
FIG. 4 is an illustration depicting in an embodiment clickstream trails within a set of web pages, in accordance with an aspect of the present invention.

FIG. 3 presents a flowchart generally representing the steps undertaken in one embodiment for performing web destination profiling. At step 302, user traffic may be analyzed at a particular web destination. In general, the user traffic at a particular web destination may represent differentiated clickstream data and undifferentiated clickstream data. For example, FIG. 4 presents an illustration depicting in an embodiment clickstream trails within a set of web pages 402. A clickstream trail may mean a path from a web destination through one or more intermediate web destinations to another web destination. There may be two types of clickstream trails illustrated in FIG. 4: a differentiated clickstream trail 404 representing differentiated clickstream data and an undifferentiated clickstream trail 406 representing undifferentiated clickstream data.

The differentiated clickstream data may represent a small fraction of user traffic with information about some characteristics of each user. Differentiated clickstream data may be augmented with some of the characteristics of each user that may be available from a user profile. For example, a user profile may be accessible during a user session for a user who may have logged in to a web site and may have provided user profile information. In addition, the system may have access to information from an Internet Service Provider (ISP) and the clickstream trails of undifferentiated users may be examined to determine if any may have logged in to a trusted system from which profile information for a user may be available. Even if the user may not have logged in, machine learning may alternatively be applied to predict the characteristics of a user based on the behavior of that user, particularly if the user session may be long-lasting or includes highly discriminative behavior.

The undifferentiated clickstream data may represent a large volume of user traffic whose characteristics may be unknown, yet its clickstream trails may be known. Undifferentiated clickstream data may be gathered in two primary ways: user-based samples and location-based samples. User-based samples may be produced when the behavior of a user may be available to the system. For instance, the behavior of a user may be available to a system if the system may be the ISP of the user and may be authorized to make use of the behavioral information. Alternatively, the owner of the system might acquire ISP data. Moreover, an owner of a system may also have other mechanisms to gather such data, such as a toolbar which may observe user behavior and transmit some or all of it back to the system.

Undifferentiated clickstream data may also be gathered by collecting location-based samples. Location-based samples may be produced whenever users may visit a particular website, and then the owner of the website may observe the behavior of the users while on the website. For example, the owner may observe which links the user clicks to navigate the website and which links the user clicks in order to leave the website. In the context of a large search engine, location-based samples of undifferentiated clickstream trails may provide a good understanding of the web destinations across the world wide web that are reachable directly via a search.

Those skilled in the art may appreciate that other information may be used in analyzing traffic for a web destination. Such information may, for example, include graph data and site structure information. Graph data may represent ways users may reach a web destination including browsing, searching, or bookmarks. Graph data may be available from a search engine or other source that may produce a large-scale crawl of the web. Additionally, graph data may be available by querying an engine which supports inlink and outlink queries.

Site structure information may be available by global analysis of one or more websites and may include the structure of Uniform Resource Locators (URLs). Such an analysis may reveal that two web sites may have the same owner listed in their DNS records, or that the web sites may employ the same template and therefore may likely be managed by the same entity. Similarly, a single site may have two sub-sites which are owned by distinct individuals. This might be uncovered by particular known URL constructions such as http://www.site.com/homes/jim, or by analysis of the interlinking behavior on a site. The structure of URLs may also provide a hierarchical view of the proximity of URLs. For example, http://www.site1.com/a/b and http://www.site2.com/a/c have in common the prefix http://www.site1.com/a, and may therefore be viewed as quite similar.

The analysis of user traffic, including differentiated clickstream data, may be applied at step 304 for determining known characteristics of a web destination profile. A technique for doing so in an embodiment may be to infer the characteristics of a visitor population by direct observation of a particular web destination, if a large number of differentiated trails have passed through that web destination.

The analysis of user traffic, including undifferentiated clickstream data, may be applied at step 306 for determining unknown characteristics of a web destination profile from other web destination profiles. In various embodiments, characteristics may be propagated from other web destination profiles to determine unknown characteristics of a web destination profile. For instance, characteristics may be inferred from other web destinations by modeling traffic flow through the other web destinations, characteristics may be estimated from other web destinations by predicting traffic flow through the other web destinations, characteristics may be propagated from other web destination profiles by smoothing, and so forth. Further details of the implementation in various embodiments for determining unknown characteristics of a web destination profile from other web destination profiles may be presented below in conjunction with the description of FIG. 5.

After determining characteristics of a web destination profile, the web destination profile may be stored in persistent storage at step 308 for use by applications such as an online application for population-targeted advertising, and processing may be finished for performing web destination profiling.

Figure 5:
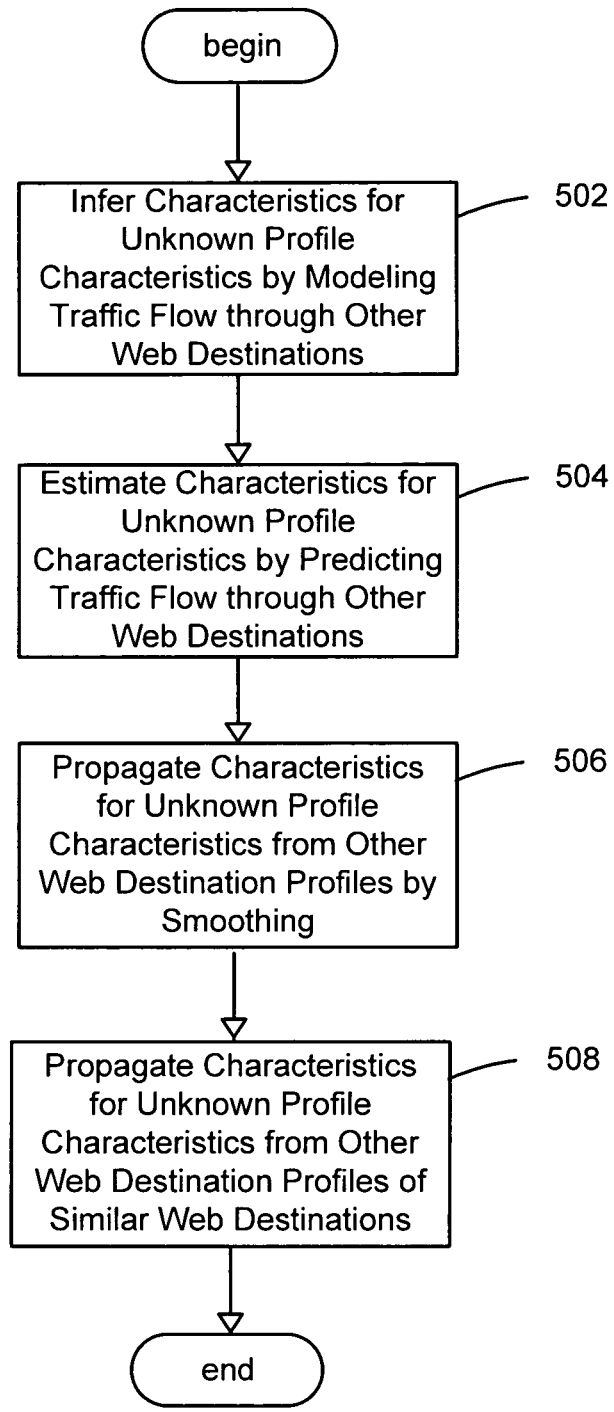
FIG. 5 is a flowchart generally representing the steps undertaken in one embodiment for determining unknown characteristics of a web destination profile, in accordance with an aspect of the present invention.

FIG. 5 presents a flowchart generally representing the steps undertaken in one embodiment for determining unknown characteristics of a web destination profile. At step 502, unknown profile characteristics may be inferred by modeling traffic flow through other web destinations. In an embodiment, a Markov model may be used to model traffic flow for a set of web pages. For example, consider X to be the set of objects in a probability space of the joint distribution over all user characteristics. For example, an element of X may specify age, zipcode, as well as interests. Each user may therefore be represented by one or more elements of X and X may be represented as a full materialization of a joint distribution over several dimensions of characteristics, such as age, gender, geography, and interests. It should be noted that the techniques may also operate in a more general setting, in which the representation of this joint distribution is implicit. In such a representation, techniques for smoothing the joint distribution may be employed in an embodiment, so that the probability of a particular element of X may be estimated before that element has been seen.

Consider a set of web pages, and a matrix M whose $(i, j)^{th}$ entry may be 1 if page i may link to page j, and 0 otherwise. Also consider od(i) to represent the out-degree of i: $od(i) = |\{j | M_{i,j} = 1\}|$. Then consider $M'_{i,j} = M_{i,j}/od(i)$; thus, M' may represent a row-stochastic variant of M, which may be seen as the matrix of a Markov process. Next, consider $M^e$ to be a variant of M' which has been modified to be ergodic, using for instance the approach described in copending U.S. Patent Application entitled: "System and Method of User-Sensitive PageRank", or any other technique. Then a unique vector $\vec{p}$ may be computed with one entry per web page whose $i^{th}$ entry may be the steady state probability that the Markov chain according to $M^e$ may be at state i. Considering that the distribution of user characteristics at page i may be given by $D_i$, then, by the definition of steady state, $p_j$ may be represented as follows:

$$p_j = \sum_{i|M^e_{i,j}>0} p_i M^e_{i,j}$$

Thus, the steady state of the markov process defined by $M^e$ may induce a steady-state flow on each edge. A simple technique may be used to estimate the traffic flow in the presence of the link topology, but the absence of any behavioral data. To begin with, a primary simplifying assumption may be made: assume that if traffic departs from a web page to three possible next states, each with equal probability of ⅓, traffic restricted to a subset of X will depart according to the same distribution. That is, if half the visitors to a site depart by following some link, then assume half the male visitors, and half the 20-year-old visitors, may likewise depart by following that same link. By considering the next state to be independent of the user characteristics, topological information and undifferentiated click trails may be used in order to determine how particular population characteristics may propagate.

Given this assumption, each element of X may then be viewed as a particular commodity flowing through the network. If some p fraction of the total flow of the entire system may be represented in the steady state as 40-year-old women visiting page u, and ⅓ of the flow departing page u may travel to page v, then at least a p/3 fraction of the total flow of the system may arrive at page v in the form of 40-year-old women. However, other nodes may also send 40-year-old women to page v that may result in a higher overall concentration than p/3 in the steady state. To characterize the distribution $D_j$ at page j, an equation representative of a family of equations that may capture the flow of a particular commodity $x \in X$ into destination j may be defined as follows:

$$D_j = \sum_{i|M^e_{i,j}>0} p_i M^e_{i,j} D_i / p_j,$$

where $p_j$ may be seen to be the appropriate normalizing constant, and $P_i M_{i,j}^e D_i$ may be the relative fraction of users from distribution $D_i$ who may flow along the edge (i,j) and then arrive at state j.

Given a set of observations about $_i$ for various web pages i, the equation above may be employed to propagate this information throughout the remainder of the graph representing web destinations.

Unfortunately, there may be no consistent solution to these equations. One approach may be to simply write an iterative algorithm that may fix the vectors $D_i$ which may be pre-specified and that may iteratively update the remaining vectors. Because this update technique makes use of pre-specified values of $D_i$, which may be known in advance, the updated results may be normalized after each step by using a normalizing constant C:

$$D_j^{new} = \begin{cases} D_j & D_j \text{ pre-specified} \\ \dfrac{\left(\sum_{i|M^e_{i,j}>0} p_i M^e_{i,j} D_i / p_j\right)}{C} & \text{otherwise} \end{cases}$$

The initial values and the normalizing constant may be determined using well-known techniques to those skilled in the art.

In various embodiments, unknown profile characteristics may be estimated at step 504 by predicting traffic flow through other web destinations. In one embodiment, a propagated distribution may be optimized by predicting traffic flow. Consider each web page to have an observed distribution $\tilde{D}_i$, which may be unspecified for many web pages where there may not be a differentiated data point observed for those web pages. Also consider each web page to have a constant weight $w_i$ reflecting the confidence in the measurement $\tilde{D}_i$. A set of distributions may be selected to minimize the following quantity:

$$\sum_j w_j d(D_j, \tilde{D}_j) + (1 - w_j) d\left(\tilde{D}_j, \sum_{i|M^e_{i,j}>0} p_i M^e_{i,j} \tilde{D}_i / p_j\right).$$

The first term in this sum may be the distance between the predicted distribution and the observed distribution. The second term in this sum may be the distance between the predicted distribution and the propagated distribution determined by the traffic arriving at the page. A tractable approach for minimizing the quantity may be based on simple iterations as suggested above. That is, an iterative algorithm may be written that may fix the vectors $D_i$ which may be pre-specified and that may iteratively update the remaining vectors.

The precise algorithm to be employed may depends on the distance measure, $d(\cdot, \cdot)$, that may be used. In an embodiment, the $l_2$-norm could be used and a large unconstrained quadratic minimization may be solved for the set of equations. Other embodiments may employ the $l_1$-norm or $l_1$-norm measure. In either case, the distance may be represented by $|\tilde{d}_{ij} - d_{ij}|$.

The quantity, $$\sum_j w_j d(D_j, \tilde{D}_j) + (1 - w_j) d\left(\tilde{D}_j, \sum_{i|M^e_{i,j}>0} p_i M^e_{i,j} \tilde{D}_i / p_j\right),$$

may be minimized, for example, using the $l_\infty$-norm by minimizing $$\sum_i \{w_i u_i + (1 - w_i) v_i\},$$

where the non-negative variables $u_i$ and $v_i$ may be defined such that:

$$-u_i \leq \tilde{d}_{ij} - d_{ij} \leq u_i \; \forall i,j, \text{ and}$$

$$-v_i \leq \tilde{d}_{ij} - \sum_{i|M_{i,j}^e>0} p_i M_{i,j}^e \tilde{D}_i / p_j \leq v_i \; \forall i, j.$$

The quantity, $$\sum_j w_j d(D_j, \tilde{D}_j) + (1-w_j) d\left(\tilde{D}_j, \sum_{i|M_{i,j}^e>0} p_i M_{i,j}^e \tilde{D}_i / p_j\right),$$

may also be minimized in another embodiment using the $l_1$-norm by minimizing $$\sum_i \left\{ w_i \sum_j u_{ij} + (1-w_i) \sum_j v_{ij} \right\},$$

where the variables u and v may be defined as non-negative doubly subscripted variables such that:

$$-u_{ij} \leq \tilde{d}_{ij} - d_{ij} \leq u_{ij} \; \forall i, j,$$

and $$-v_{ij} \leq \tilde{d}_{ij} - \sum_{i|M_{i,j}^e>0} p_i M_{i,j}^e \tilde{D}_i / p_j \leq v_{ij} \; \forall i, j.$$

A set of equations for minimizing these quantities may be represented as linear programs that may be potentially large but may be solved using techniques well-known by those skilled in the art.

In yet another embodiment, a maximum entropy formulation, for instance as presented in J. A. Tomlin, "*A New Paradigm for Ranking Pages on the World Wide Web*", pp 350-355, Proc. World Wide Web Conference 2003 (WWW2003), Budapest, May 2003, may be employed for estimating probable surfer distribution, subject to what may be known, such as the network topology and the distribution of user characteristics at a subset of the web pages. In its simplest form where strong connectedness may be assumed and there may not be any known characteristics of the population the visited the web pages, the number of users which may migrate from web page i to web page j, denoted as $y_{ij}$ ($\geq 0$), may be constrained by the equations:

$$\sum_{j|(i,j)\in E} \cdot y_{ij} - \sum_{j|(j,i)\in E} y_{ji} = 0 \; (i = 1, \ldots, n);$$

$$\sum_{i,j} y_{ij} = Y,$$

where Y may be the total number of users.

The maximum entropy may be found by maximizing the quantity:

$$-\sum_{(i,j)\in E} y_{ij} \log y_{ij}.$$

Considering that the total traffic of users into or out of some nodes j may be known, the equations:

$$\sum_{j|(i,j)\in E} y_{ij} - \sum_{j|(j,i)\in E} y_{ji} = 0 \; (i = 1, \ldots, n)$$

may be replaced by the following pairs of equations:

$$\sum_{(j,i)\in E'} y_{ji} = h_i,$$

$$\sum_{(i,j)\in E'} y_{ij} = h_i$$

without significantly complicating the computational procedure for this class of problems.

Returning now to the population model, consider that the population description $D_i$ for node i may be mapped onto a vector of characteristics, $D_i = \langle d_{i1}, d_{i2}, \ldots, d_{iK} \rangle$, where the second index denotes the characteristics $k=1, \ldots, K$. An instance of the entropy model may then be defined for each characteristic k, having flow variables $y_{ij}^k$ and constraints:

$$\sum_{j|(i,j)\in E} y_{ij}^k - \sum_{j|(j,i)\in E} y_{ji}^k = 0 \; (i = 1, \ldots, n)$$

$$\sum_{i,j} y_{ji}^k = Y^k$$

where $Y^k$ may be the total population of users of type k. For those web pages for which user characteristic information may be known, the equations, which may be represented by $$\sum_{j|(i,j)\in E} y_{ij}^k - \sum_{j|(j,i)\in E} y_{ji}^k = 0 \; (i = 1, \ldots, n),$$

may be replaced by the following pairs of equations:

$$\sum_{(j,i)\in E'} y_{ji}^k = d_{ik},$$

$$\sum_{(i,j)\in E'} y_{ij}^k = d_{ik}.$$

Note that these particular models may be completely independent for each k, and may therefore by solved in parallel. Furthermore, these models may also be generalized in the manner described in the appendix of J. A. Tomlin, "*A New*

*Paradigm for Ranking Pages on the World Wide Web*", pp 350-355, Proc. World Wide Web Conference 2003 (WWW2003), Budapest, May 2003.

Moreover, it may be assumed that users have independent characteristics for these particular models to be completely independent for each k, and consequently the independent characteristics may not change from one type to another. Such an assumption may be relaxed in an embodiment by means of dimensional reduction of the vector $D_i$ of characteristics. For instance, consider that the matrix, $[D_{i1}, D_{i2}, \ldots, D_{iM}]$, may be approximated by the techniques of Latent Semantic Analysis (LSA), to give a set of vectors, $[C_{i1}, C_{i2}, \ldots, C_{iM}]$, where the $C_i$ may now be of the form: $C_i = \langle c_{i1}, c_{i2}, \ldots, C_{iL} \rangle$, with L<K. Such a reduction process may capture some of the interrelationships between the original characteristics, as well as reduce the problem computationally by using $c_{i1}$ rather than the $d_{ik}$ to solve L problems in parallel.

Undifferentiated trails may be used in various embodiments to modify the performance of the method above in several ways. First, the entries of the matrix M' may be determined based not on the assumption that each outlink of a web page may be selected uniformly, but based on actual observations. Additionally, in the transformation from M' to $M^e$, the undifferentiated trails may be used to estimate abandonment and restart probabilities such as described in copending U.S. Patent Application entitled: "System and Method of User-Sensitive PageRank".

Figure 6:
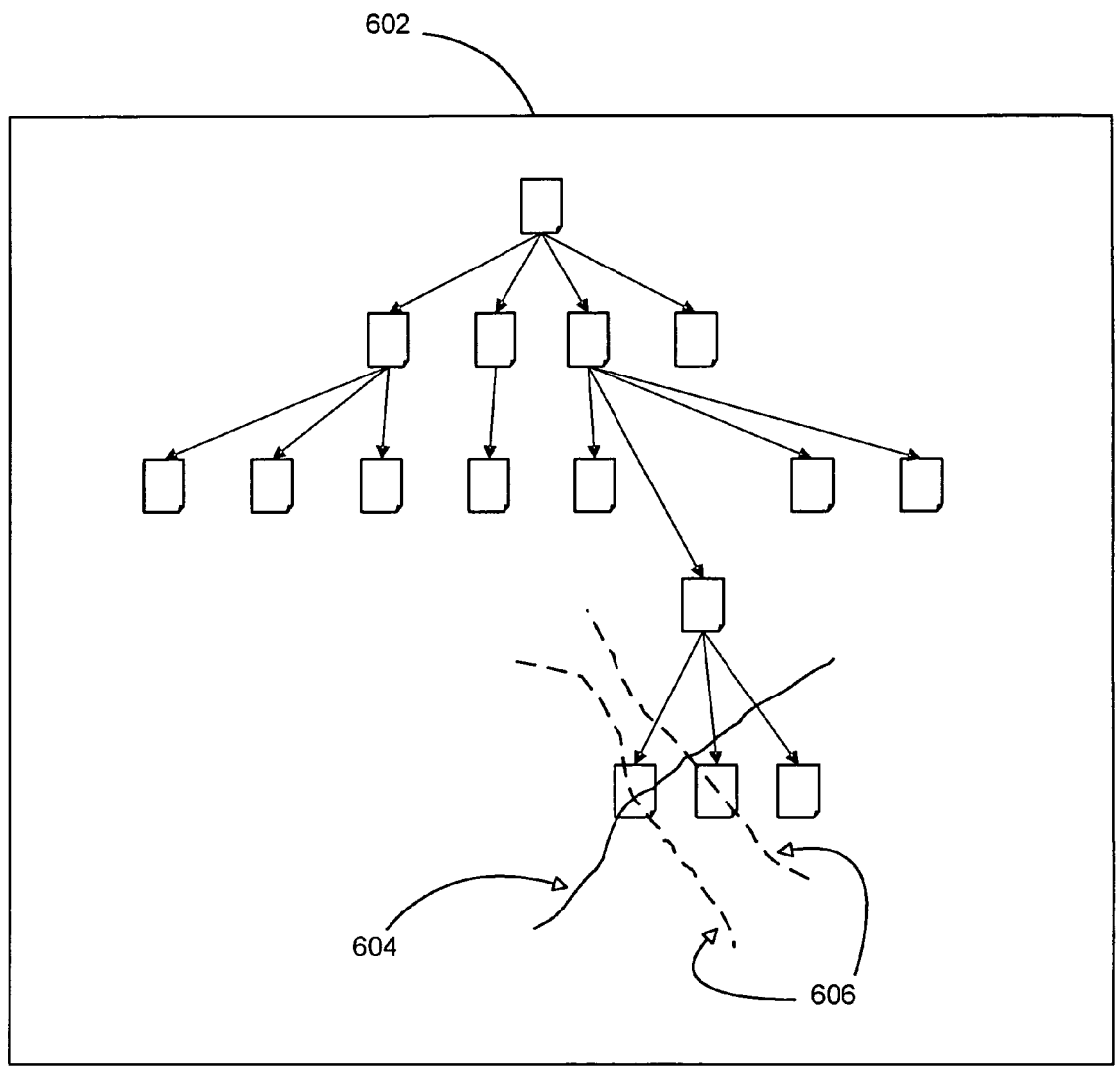
FIG. 6 is an illustration depicting in an embodiment web destination profile characteristics propagated in a hierarchy of a set of web pages by smoothing, in accordance with an aspect of the present invention.

In yet various other embodiments, unknown profile characteristics may be propagated at step 506 from other web destinations by smoothing. FIG. 6 presents an illustration depicting in an embodiment web destination profile characteristics propagated in a hierarchy of a set of web pages by smoothing. There may be two types of clickstream trails illustrated in FIG. 6 that intersect a subset of web pages in a hierarchy of web pages 602. Differentiated clickstream trail 606 may represent differentiated clickstream data and an undifferentiated clickstream trail 604 may represent undifferentiated clickstream data. Web destination profile characteristics may be propagated from web pages in the hierarchy that may intersect the differentiated clickstream trail 606 to web pages in the hierarchy that may intersect the undifferentiated clickstream trail 604. Moreover, a web destination with little traffic may have similar content as a set of other web pages and characteristics may be propagated from the set of other web pages to the web destination profile of the web page. For example, consider the following static model of propagation. For any web page i, consider u(i) to be the parent of web page i in the website of i, such that u(i) may represent one step up in the tree representing the website of i. Observe that u(i) may not actually exist as a web page in the graph; in this case, a new unvisited page may be created for u(i). Similarly, consider $u^k$ to represent the composition of k applications of u, so that $u^2(i)$ may be the grandparent of i. Finally, consider u*(i) to be the set of ancestors of i. Then, A(i) may be defined to be the aggregated distribution of the children of node i as follows:

$$A(i) = \sum_{j|j \in u^*(i)} p_j \tilde{D}_j.$$

For $j \in u^*(i)$, consider g(i,j) to represent the generalization cost of j with respect to i in order to represent the notion that web page j may be significantly higher in the website than web page i and that the subtree rooted at j may capture a much more varied distribution of users. The generalization cost g may capture this variance and may be represented as the Kullback-Liebler divergence $KL(\tilde{D}_j; \tilde{D}_i)$, or by some custom mechanism targeted for the particular notion of proximity of user characteristics required by a specific application. Recalling that $w_i$ may be a measure of the confidence of the observed distribution $D_i$ at web page I, smoothing may be performed in an embodiment as follows:

$$\tilde{D}_i^1 = w_i \tilde{D}_i + (1 - w_i) \frac{\sum_{j \in u^*(i)} g(j, i) \tilde{D}_j}{\sum_{j \in u^*(i)} g(j, i)}.$$

This may be one possible model of hierarchical smoothing that may be employed in an embodiment. Those skilled in the art will appreciate that other types of smoothing may also be employed, such as smoothing based on web destinations which are often visited by the same, and even possibly undifferentiated, user in a specific session, smoothing based on topical similarity of the content of two web pages, smoothing based on the similarity of click through behavior of users on two web pages, and so forth. For yet other examples, consider the work of West, M. and Harrison, J. (1998), *Bayesian Forecasting and Dynamic Models*, Springer-Verlag New York; pages 581-597.

In yet various additional embodiments, unknown profile characteristics may be propagated at step 508 from other web destination profiles of similar web destinations. Even when traffic may not be observed or inferred, an approximate profile of characteristics may be generated by an analysis of the content of a web destination. Consider, for example, two websites, one of which may be observed with high traffic, and for which an accurate profile of characteristics may be determined. On the other hand, the traffic for the second website may be very low, but the second website may be quite similar to the first in terms of one or more of content, presentation, topology, inlinks, anchortext, and so forth. In such as case, those skilled in the art may appreciate that the visitor profiles of the two sites may be also inferred to be similar, in the absence of other information. There may be many known techniques to compute such similarities, such as the Jaccard coefficient, the cosine measure and the KL divergence. Any of these may reasonably be applied to any of the features listed above, including content, presentation, topology and so forth, to determine a similarity score between a high-traffic site and a low-traffic site. The profile of the most similar high-traffic site may then the propagated in various embodiments to the low-traffic site, even without any observation of the traffic at the low-traffic site. This approach may be viewed as applying a 1-nearest-neighbor classifier to classify the low-traffic website, using higher-traffic sites for which profiles may available as the potential neighbors for the classifier. In a more sophisticated embodiment, it is possible to apply other classification algorithms such as Support Vector Machines, Decision Trees, and so forth, in the same domain, based on the features of the web destination such as content, presentation, topology and so forth. This general family of techniques may represent a type of smoothing which may require little or no traffic data for the destination website. Moreover, those skilled in the art may appreciate that any measure of similarity between web destinations may be applied in this manner without limitation. For example, a less well-studied approach may be applied to determine the similarity of two websites based on the ranks in which those sites appear in the search results page of search queries.

After determining characteristics of a web destination profile, the web destination profile may be used by many applications such as online applications for population-targeted advertising. For instance, an application that may display advertisements to users who visit a web destination may use the present invention to select advertisements using web destination profiles for display with content of the web destinations. Advantageously, an advertisement may be selected using the web destination profile when the system may have limited knowledge of the content of the web destination and/or the profile of the particular user visiting the web destination. Moreover, applications may select an advertisement using the web destination profile and a user profile, if available. Additionally, applications may select an advertisement using the web destination profile and using content matching for the web destination.

Figure 7:
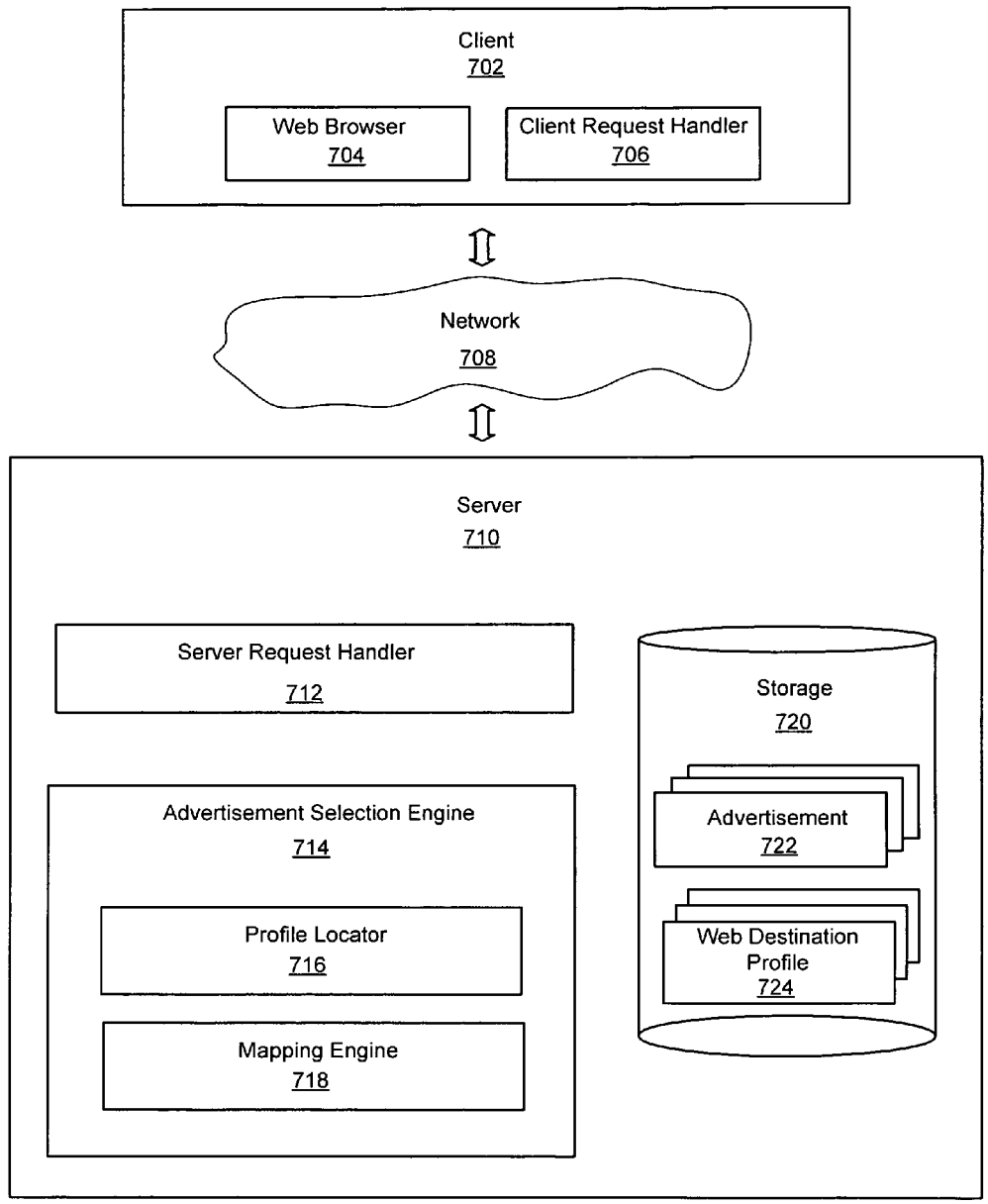
FIG. 7 is a block diagram generally representing an exemplary architecture of system components in an embodiment for online population-targeted advertising, in accordance with an aspect of the present invention.

FIG. 7 presents a block diagram generally representing an exemplary architecture of system components in an embodiment for online population-targeted advertising. Those skilled in the art will appreciate that the functionality implemented within the blocks illustrated in the diagram may be implemented as separate components or the functionality of several or all of the blocks may be implemented within a single component. For example, the functionality for the profile locator 716 may be included in the same component as the mapping engine 718.

In various embodiments, a client computer 702 may be operably coupled to one or more servers 710 by a network 708. The client computer 702 may be a computer such as computer system 100 of FIG. 1. The network 708 may be any type of network such as a local area network (LAN), a wide area network (WAN) such as the Internet, or other type of network. An application such as a web browser 704 may execute on the client computer 702 and may include functionality for requesting content items at web destinations. The web browser 704 may also include a client request handler 706 for sending requests for content items at web destinations to web page servers and for receiving content items from web page servers. The present invention operable on server 710 may support providing advertisements 722 selected using a web destination profile 724 to the web browser 704 for display to a user.

The server 710 may be any type of computer system or computing device such as computer system 100 of FIG. 1. In various embodiments, the server may be a web page server that may provide services for providing web pages with various content as well as advertisements selected using web destination profiles for the requested web pages. The server 710 may also include a server request handler 712 for receiving and responding to requests for web pages with content items and an advertisement selection engine 714 for providing advertisements 722 selected using a web destination profile 724. The advertisement selection engine 714 may, in turn, include a profile locator 716 for locating a web destination profile 724 for a web destination and a mapping engine 718 for mapping a web destination profile 724 to an advertisement 722. Each of these modules may also be any type of executable software code such as a kernel component, an application program, a linked library, an object with methods, or other type of executable software code.

The server 710 may include a storage 720 operably coupled to the advertisement selection engine 714. The storage 720 may be any type of computer-readable media and may store one or more advertisements 722 and web destination profiles 724. When a URL for a web page may be displayed by a web browser 704 and may be subsequently selected by a user, a request for a web page providing the content may be made to the server 710. The server 710 may be a web page server and may also provide services for providing advertisements selected using web destination profiles for the requested web pages for display to a user in addition to the content of the web pages. In various other embodiments, another server configured as a web page server may provide services for providing web pages with various content and the server 710 may provide services for providing advertisements selected using web destination profiles for the requested web pages for display to the user. In this case, the web page server may receive a request for a web page with content and forward the request for the web page to the server 710, and server 710 may respond by providing one or more advertisements 722 to the web browser 704 for display to the user.

Figure 8:
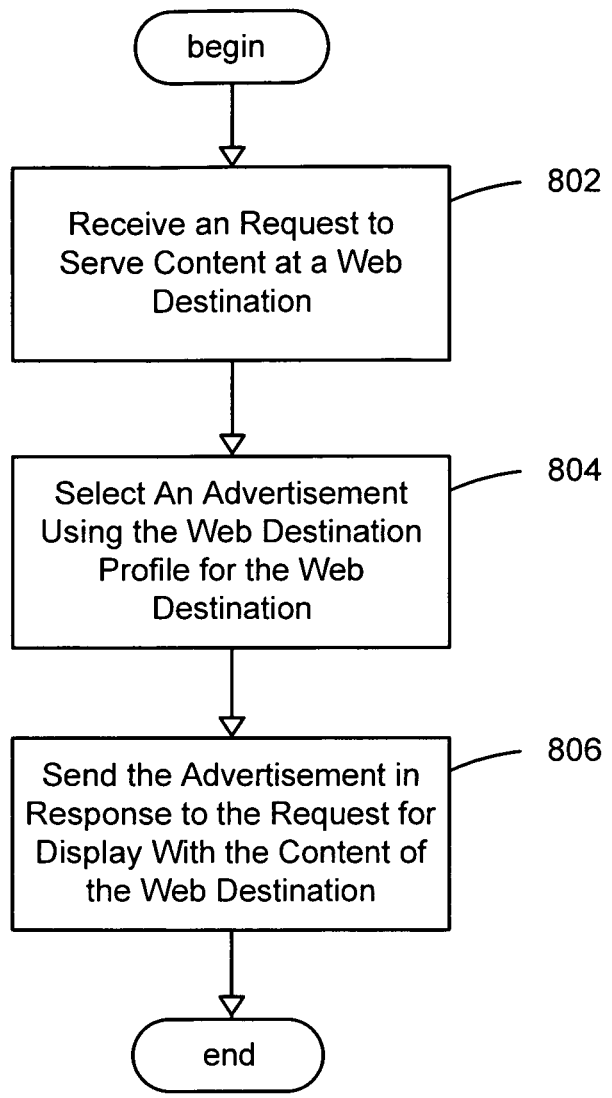
FIG. 8 is a flowchart generally representing the steps undertaken in one embodiment for online population-targeted advertising, in accordance with an aspect of the present invention.

FIG. 8 presents a flowchart generally representing the steps undertaken in one embodiment for online population-targeted advertising. At step 802, a request may be received to serve content of a web destination. For example, a request may be received by a server for providing content of a web destination that may be a managed website of a content match advertising service. Such a service may manage an inventory of advertisements from which one or more advertisements may be presented for display to a visitor of the web destination.

At step 804, an advertisement may be selected using a web destination profile for the web destination. In an embodiment, a server may locate a web destination profile for the web destination and then map the web destination profile to one or more advertisements. The web destination profiles may be previously mapped offline to one or more advertisements using various techniques, including mapping a web destination profile to an advertisement with high click through rates for visitors having characteristics similar to the web destination profile. In various embodiments, a score may be associated with each advertisement that may indicate how well the characteristics of the web destination profile matched the profile characteristics associated with each advertisement. Such a score may be used for merging with a list of advertisements scored by using a user profile, if available, or scored by matching content of the web destination.

At step 806, the advertisement may be sent in response to the request for content of the web destination for display with the content of the web destination. In an embodiment, several advertisements may be sent to a web browser for display to a user. After the advertisement may be sent for display to a user, processing may be finished for online population-targeted advertising.

Thus the present invention may be used by applications that may display advertisements to users who visit a web destination, including managed content properties, to select advertisements using web destination profiles for display with content of the web destinations. Advantageously, an advertisement may be selected using the web destination profile where the system may have limited knowledge of the content of the web destination and/or the profile of the particular user visiting the web destination. Moreover, a web destination profile may be used as a prior distribution of characteristics to estimate characteristics of a user that the system may know little about, for instance, based on some user-specific behavior such as recent browsing history of the user. In addition to employing the techniques described for web destination profiling as part of an application or system for selecting advertisements, those skilled in the art will appreciate that any number of the specific techniques described for web destination profiling may be used as a standalone technique to select advertisements.

As can be seen from the foregoing detailed description, the present invention provides an improved system and method for web destination profiling for online population-targeted advertising. The system and method may analyze traffic at a particular web destination in order to understand the population visiting the web destination and may determine unknown characteristics of the population visiting the web destination using a variety of techniques including inferring characteristics by modeling traffic flow through other web destinations, estimating characteristics from other web destination profiles by predicting traffic flow through other web destinations, propagating characteristics to a web destination profile by smoothing a joint distribution of characteristics of other web destination profiles, and so forth. Advantageously, any number of these techniques may be used to select advertisements. Even when traffic may not be observed or inferred, unknown profile characteristics may be propagated from other web destination profiles of similar web destinations. As a result, the system and method provide significant advantages and benefits needed in contemporary computing and in online applications.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system serving advertisements, the system comprising:
   an input/output device receiving an indication of a first web destination;
   a memory storing a web destination profile comprising a set of characteristics of a population of visitors visiting the first web destination, wherein at least one characteristic is unknown;
   a processor device operably coupled with the memory, said processor device executing instructions comprising:
      when user traffic to the first web destination cannot be observed or inferred, performing steps of:
         comparing content of a second web destination to content of the first web destination;
         determining that visitor profiles of the second web destination contain characteristics similar to those of the population of visitors visiting the first web destination when the compared content is determined to be similar;
         analyzing user traffic at the second web destination to understand the population visiting said second web destination when it is determined that the visitor profiles are similar;
         propagating the web destination profile for the first web destination with known characteristics derived from analyzing the user traffic at the second web destination;
   wherein the user traffic comprises both differentiated and undifferentiated clickstream trails and wherein the undifferentiated clickstream trails comprise data that is undifferentiated as to the visitors to the second web destination;
   wherein the second web destinations are web pages in a hierarchy of web pages that intersect the differentiated clickstream trails;
   selecting an advertisement using the propagated web destination profile for the first web destination; and
   serving the advertisement selected for display to a user.

2. The system of claim 1 wherein the memory comprises storage for storing a plurality of advertisements.

3. The system of claim 1 wherein the instructions further comprise mapping the propagated web destination profile to the advertisement.

4. The system of claim 1 wherein the instructions further comprise locating the web destination profile for the first web destination.

5. The system of claim 1 wherein the instructions further comprise receiving the advertisement selected using the propagated web destination profile for display to the user at a client device operably coupled with the server.

6. The computer system of claim 1 wherein the instructions for comparing the content further comprise comparing at least one of: presentation, topology, in-links, and anchor text.

7. A computer-implemented method for serving advertisements, comprising:
   using an input/output subsystem receiving an indication of a first web destination;
   storing in memory a web destination profile comprising a set of characteristics of a population of visitors visiting the first web destination, wherein at least one characteristic is unknown;
   using an information processor device performing:
      when user traffic to the first web destination cannot be observed or inferred, performing steps of:
         comparing content of a second web destination to content of the first web destination;
         determining that visitor profiles of the second web destination contain characteristics similar to those of the population of visitors visiting the first web destination when the compared content is determined to be similar;
         analyzing user traffic at the second web destination to understand the population visiting said second web destination when it is determined that the visitor profiles are similar;
         propagating the web destination profile for the first web destination with known characteristics derived from analyzing the user traffic at the second web destination;
   wherein the user traffic comprises both differentiated and undifferentiated clickstream trails and wherein the undifferentiated clickstream trails comprise data that is undifferentiated as to the visitors to the second web destination;
   wherein the second web destinations are web pages in a hierarchy of web pages that intersect the differentiated clickstream trails;
   selecting an advertisement using the propagated web destination profile for the first web destination; and
   serving the advertisement selected using the propagated web destination profile for display to a user.

8. The method of claim 7 further comprising locating the propagated web destination profile for the first web destination.

9. The method of claim 7 further comprising mapping the propagated web destination profile to the advertisement.

10. The method of claim 7 wherein receiving the indication of the first web destination comprises receiving a request to serve content at the first web destination.

11. The method of claim 7 wherein serving the advertisement selected using the propagated web destination profile for display to the user comprises sending the advertisement in response to a request to serve content at the first web destination for display with the content of the first web destination.

12. The method of claim 7 wherein selecting an advertisement using the web destination profile for the first web destination comprises merging a list of advertisements selected using the propagated web destination profile with a list of advertisements selected using a user profile.

13. The method of claim 7 wherein selecting an advertisement using the web destination profile for the first web destination comprises merging a list of advertisements selected using the propagated web destination profile with a list of advertisements selected by matching content of the first web destination.

14. A computer program product comprising a non-transitory computer readable storage medium with computer-executable instructions stored therein, said instructions, when executed, causing a computing device to perform:
  receiving an indication of a first web destination;
  storing a web destination profile comprising a set of characteristics of the population of the visitors visiting said first web destination, wherein at least one characteristic is unknown;
  when user traffic to the first web destination cannot be observed or inferred, performing steps of:
    comparing content of a second web destination to content of the first web destination;
    determining that visitor profiles of the second web destination contain characteristics similar to those of the population of visitors visiting the first web destination when the compared content is determined to be similar;
    analyzing user traffic at the second web destination to understand the population visiting said second web destination when it is determined that the visitor profiles are similar;
    propagating the web destination profile for the first web destination with known characteristics from derived from analyzing the user traffic at the second web destination;
  wherein the user traffic comprises both differentiated and undifferentiated clickstream trails and wherein the undifferentiated clickstream trails comprise data that is undifferentiated as to the visitors to the second web destination;
  wherein the second web destinations are web pages in a hierarchy of web pages that intersect the differentiated clickstream trails;
  selecting an advertisement using the propagated web destination profile for the first web destination; and
  serving the advertisement selected for display to a user.

15. The computer program product of claim 14 further comprising instructions for mapping the propagated web destination profile to the advertisement.

16. The computer program product of claim 14 further comprising instructions for locating the web destination profile for the first web destination.

17. The computer program product of claim 14 wherein receiving the indication of the first web destination comprises receiving a request to serve content at said first web destination.

18. The computer program product of claim 14 wherein selecting an advertisement using the web destination profile for the first web destination comprises merging a list of advertisements selected using the propagated web destination profile with a list of advertisements selected using a user profile.

19. The computer program product of claim 14 wherein selecting an advertisement using the web destination profile for the first web destination comprises merging a list of advertisements selected using the propagated web destination profile with a list of advertisements selected by matching content of the first web destination.

* * * * *